3,312,751

PRODUCTION OF MERCAPTANS OR THEIR OLEFINIC DERIVATIVES

George T. Kerr, Lawrence Township, Mercer County, and Phillip S. Landis, Woodbury, N.J., assignors to Mobil Oil Corporation, a corporation of New York No Drawing. Filed Nov. 19, 1963, Ser. No. 324,849
16 Claims. (Cl. 260—677)

This invention relates to the production of mercaptans or derivatives thereof containing an olefinic linkage in the presence of an alumino-silicate having unique catalytic activity, and in particular, to the synthesis of mercaptans by effecting reaction of olefins and hydrogen sulfide as well as the production of olefinic compounds by effecting dehydrosulfurization of mercaptans in the presence of alumino-silicate catalysts. Also, this invention relates to a process for selectively separating certain olefins from hydrocarbon mixtures by effecting synthesis to their corresponding mercaptans, removing the mercaptans from the hydrocarbons, and thereafter effecting dehydrosulfurization of the mercaptans to reform the olefins.

This invention contemplates effecting reaction of a compound containing an olefinic linkage and hydrogen sulfide to produce a corresponding mercaptan under certain reaction conditions in the presence of a catalyst prepared from naturally occurring or synthetic alumino-silicates having active cation sites within an ordered internal structure. These cation sites are formed by the presence of certain exchangeable metal and/or hydrogen cations ionically bonded or chemisorbed within the ordered internal structure of the alumino-silicate; preferably the cations are such that certain alumino-silicates have a high concentration of hydrogen sites formed within their ordered internal structure. Also, this invention covers a process for effecting dehydrosulfurization of a mercapto-containing compound to form olefinic compounds or like compounds containing an olefinic linkage and hydrogen sulfide under other reaction conditions in the presence of the heretofore described catalysts.

In addition, this invention is directed to a process for separation of a highly reactive olefinic compound from a hydrocarbon mixture by effecting reaction of the olefin with hydrogen sulfide to form a mercaptan, separating the mercaptan from the hydrocarbon mixture, and then effecting dehydrosulfurization of the mercaptan to reform the original olefinic compound; said reactions being effected in the presence of the aforementioned alumino-silicate catalyst.

In accordance with this invention, it has been found that compounds having an olefinic linkage can be reacted with hydrogen sulfide to form mercaptans at relatively low reaction temperatures in the presence of an alumino-silicate catalyst having exchangeable metal and/or hydrogen cations within its ordered internal structure. These exchangeable cations may be present within the catalyst by base exchanging the cations with synthetic or naturally occurring alumino-silicate, by incorporating the cations during the formation of a synthetic alumino-silicate, or by being an integral portion of a naturally occurring alumino-silicate. It has also been found that the synthesized mercaptans and other compounds containing a mercapto group can be dehydrosulfurized to form compounds having an olefinic linkage and hydrogen sulfide at temperatures higher than those used for the aforementioned synthesis in the presence of the alumino-silicate catalyst.

Furthermore, tertiary olefins such as isobutylene can be selectively separated from mixtures of other olefinic compounds and other hydrocarbons by reacting with hydrogen sulfide to form the corresponding tertiary mercaptans at selected operating conditions in the presence of certain alumino-silicate catalysts. The resulting mercaptans can be readily separated from the reaction mixture and then can be dehydrosulfurized or decomposed at higher temperature to produce the initial reactive olefinic compounds in the presence of the same or other alumino-silicate catalysts. In general, the unique activity of the alumino-silicate catalyst for effecting synthesis or dehydrosulfurization of mercaptans is dependent on the nature and concentration of its active sites as well as the availability of these sites for contact with the reactants.

A variety of compounds having olefinic linkages may be used as reactants for the synthesis of mercaptans. Among the olefinic hydrocarbons are ethylene, propylene, butylene, isobutylene, cyclohexene, butadiene, isoprene, 1,1-diphenylethylene, triphenylethylene, 2-pentene, and the like. Also, the olefinic compounds may have non-interfering substituent groups attached to their molecular moieties. For example, the halo groups, nitro, cyano, carboxy, alkoxy, and the like groups may be part of the olefinic compounds. These substituted olefinic hydrocarbons include acrylonitrile, methacrylonitrile, nitroethylene, vinyl chloride, and the like. In general, the unsaturated compounds may have one or more olefinic linkages which may be part of or attached to a linear or cyclic chain containing from 2 to 30 carbon atoms per molecule. The olefinic hydrocarbons are the preferred reactants.

Certain olefinic compounds are more reactive than others. Particularly reactive are those compounds containing a tertiary carbon atom as part of the olefinic linkage, i.e., a carbon atom having a double bond and also being attached to two additional carbon atoms which may be a part of an alkyl, aryl, or other hydrocarbon group. Typical of these tertiary compounds are isobutylene, trimethylethylene, 2-methylbutene-1, 1,1-diphenylethylene, triphenylethylene, and the like. In general, the order of reactivity of the olefinic compounds is as follows: tertiary>secondary>primary. Advantageously, due to the unique activity of the alumino-silicate catalysts, the tertiary olefins and hydrogen sulfide can be reacted under certain operating conditions without causing reactions of the less reactive olefins or other hydrocarbons. These selective reactions are usually promoted in the vapor phase at low temperature, e.g. below 100° C., with catalyst contact times on the order of a fraction of a second to a few minutes.

The mercaptans (thiols) synthesized from or converted to olefinic compounds by the present process may be acyclic, alicyclic, cyclic, aromatic, heterocyclic, and the like organic compounds containing one or more mercapto groups (—SH) within their molecular moieties. In general, these compounds contain from 1 to 30 carbon atoms per molecule and preferably from 1 to 15 carbon atoms. The mercapto group may be in a terminal position or attached as a branched chain substituent of an acyclic compound. Also, the mercapto group may be attached directly to the ring structure of an alicyclic hydrocarbon or on a side chain of an aromatic or heterocyclic compound. Representative of some of the mercaptans that may be synthesized or dehydrosulfurized are methyl mercaptan, ethyl mercaptan, propyl mercaptan, 1-butanethiol, 1,2-ethanedithiol, cyclohexyl mercaptan, tertiary butyl mercaptan, tertiary amyl mercaptan, tolyl mercaptan, and the like.

It will be appreciated that organic sulfides and other sulfur containing compounds may also be formed during synthesis of the mercaptans. Exemplary of the sulfides are methyl sulfide, phenyl sulfide, methyl ethyl sulfide, cetyl ethyl sulfide, tertiary butyl sulfide, and the like. Advantageously, in the selective separation of tertiary olefins, many of these compounds may also be converted to the corresponding olefins during dehydrosulfurization of the mercaptans.

Several methods may be used to separate the mercaptans and other sulfur-containing compounds from the hydrocarbon streams formed by the processes of this invention. One suitable method involves passing the mercaptan enriched hydrocarbon stream through a heat exchanger to condense the mercaptans and other higher boiling point products, e.g., sulfides and the like. Such product streams may also be treated with an aqueous caustic solution in a scrubbing tower to convert the mercaptans and sulfides to the corresponding alkali mercaptides and alkali sulfides or hydrosulfides. The hydrocarbons are unaffected by the caustic and may be vented from the tower. The caustic solution containing the mercaptides and sulfides may then be heated in a still to convert the mercaptides back to mercaptans; which with some water are distilled from the solution and thereafter recovered. Also, the mercaptans may be absorbed from the hydrocarbons by mineral oils and the like, which are well known in the absorption art.

Hydrogen sulfide formed during dehydrosulfurization of the mercaptans may be removed from the reaction mixture by conventional processes involving absorption with liquid solutions such as alcohol amines or alkaline phosphates or by known chemical treatments in which it is converted to an organic sulfide, an inorganic sulfide or sulfur.

In accordance with this invention, several different alumino-silicate catalysts may be employed to promote the conversion of reactions of this invention. Particularly effective catalysts are prepared from alumino-silicates that contain a high concentration of hydrogen sites within an ordered internal structure. These hydrogen sites are produced by ionically bonding or chemisorbing hydrogen cations within the molecular structure of the alumino-silicate. Such bonding or chemisorption may be effected by base exchange of the alumino-silicate with a fluid medium containing the hydrogen cations; the resulting exchanged product thus acquiring an acid character.

In addition, those alumino-silicates having a sparse distribution of hydrogen sites may also be employed as catalysts for the present process. Thus, the alkali metal and alkaline earth metal (e.g., sodium, lithium, calcium, potassium and the like) forms of the synthetic and naturally occurring alumino-silicates, including zeolite A and the faujasites such as zeolites X and Y, may serve as catalysts. (These zeolites are hereinafter described in greater detail.) Often these alumino-silicate catalysts are utilized for reactions involving olefins or thiols that are more reactive, such as isobutylene and its corresponding thiol.

Advantageously, the alumino-silicate catalysts having a high concentration of hydrogen sites may be prepared from a variety of naturally occurring and synthetic alumino-silicates. These alumino-silicates have exchangeable metal cations (e.g., alkali metals and alkaline earth metals) that may be completely or partially replaced by conventional base exchange with certain other metal cations and/or hydrogen cations to produce the necessary concentration of hydrogen sites within an ordered internal structure.

Some alumino-silicates can be base exchanged directly with hydrogen cations to form the said catalysts for this invention; however, other alumino-silicates such as zeolite X, a synthetic faujasite, are not suitable to direct base exchange with hydrogen cations, or are not structurally or thermally stable after a portion of their exchangeable metal cations have been replaced with hydrogen cations. Thus, it is often necessary to exchange other metal cations with these alumino-silicates to achieve the necessary stability within the ordered internal structure prior to the inclusion of the hydrogen cations. In effecting such stability, it has been found that base exchange of certain polyvalent metal cations (such as those of the rare earth metals), not only provides stability to the alumino-silicate, but also increases the concentration of hydrogen sites without the subsequent base exchange of hydrogen cations. Apparently, the bonding of metal cations, particularly those polyvalent cations having higher valences within certain alumino-silicates, causes the formation of hydrogen sites within their ordered internal structures. It is believed that such metals, especially those which have valences of three or more, produce hydrogen sites within the alumino-silicate because of the spatial arrangement of the $AlO_4$ and $SiO_4$ tetrahedra which make up the ordered internal structure of the alumino-silicate.

Within certain alumino-silicates, where nearly every other tetrahedron has an exchangeable cation site (usually an alkali metal or alkaline earth metal), a polyvalent cation (two valent and even some three valent cations) may be accommodated within chemical bond distance by two or three, respectively, neighboring cation sites. However, if this accommodation is not spatially feasible, it is belived that the polyvalent metal cation is hydrolyzed thereby reducing its valence by the addition of one (or more, depending on its valence) hydroxy groups $[OH]^-$ and creating from water molecules (present in the alumino-silicate structure) a hydrogen cation (for each $[OH]^-$ group) which then occupies one of the sites vacated by the exchangeable metal cation.

In this manner, those metals having higher valences may provide a higher concentration of hydrogen sites within an alumino-silicate. Thus, the formation of hydrogen sites within an alumino-silicate may occur while base exchanging the metal cations with a naturally occurring or synthetic zeolite or during the formation of a synthetic zeolite in an ionizable medium. Furthermore, the high concentration of hydrogen sites created by these metals may be further increased by subsequent base exchange with hydrogen cations or cations which are capable of being converted to hydrogen cations; e.g., the ammonium radical ($NH_4^+$).

It should be noted that in some instances there is no patent evidence for the presence of the hydrogen cation in the absence of reactant. For instance, some of the catalysts of this invention, when contacted with water, may be found to confer a neutral or even alkaline reaction to the water. In such instances the hydrogen cation is believed to form, under reaction conditions, by dislocation of the alkali metal cation in contact with the reactant and/or traces of impurities such as water and $CO_2$, and the like.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by elemental analysis and reduction of exchange capacity. Thus, among the faujasite isomorphs, the zeolite known as "Y" will have a sparser distribution of sites within the pores than the zeolite known as "X." It has been found that alumino-silicates having a high silicon to aluminum atomic ratio are more desirable for preparing the catalyst of this invention, preferably the silicon to aluminum atomic ratio is at least 1.8. These catalysts are readily treated to contact with solutions which contain hydrogen ions and are readily regenerable, after having been used, by contact at elevated temperatures with an oxygen containing stream under controlled conditions such that the carbonaceous residues may be efficiently removed without damage to the essential structure and properties of the catalyst.

In addition, the unique activity of the alumino-silicate catalysts contemplated by this invention may be continuously activated so as to maintain a high level of activity while on stream. This continual activation is effected by controlling the sparsity of distribution of active acid sites formed within the ordered internal structure of the catalyst. It will be realized that during the present process some degradation and polymerization products are formed which produce a coke-like material on the alumino-silicate catalyst. The accumulation of this material causes the catalyst to gradually lose its effective activity by blocking off the active acid sites for contact with the reactants.

However, it has been found that the effects of these undesirable products may be controlled by the introduction of carbon dioxide and other like oxygen-containing compounds into the reactants. It will be appreciated that these activators may be introduced in the charge stream or in separate streams if desired. The activators are particularly effective with alkali metal salts of the alumino-silicate catalysts. In general, the molar ratio between the reactants and the activating materials may range from about 0.001 to about 0.5. It will be appreciated that the selection of a particular activating material as well as its mode of introduction will be dependent upon the catalyst to be activated and the reactants being employed.

It will also be appreciated that the concentration of the hydrogen sites produced either by direct exchange of hydrogen cations or by hydrolysis of exchanged polyvalent metal cations within certain alumino-silicates as described above, may vary according to the cations employed, the degree of base exchange, as well as the alumino-silicate being treated. Accordingly, it has been determined that the alumino-silicates having at least 0.5 milliequivalent of hydrogen per gram of solid and preferably above about 0.75 milliequivalent of hydrogen per gram of solid provide effective acid catalysts for the purposes of this invention. It will be understood that this value indicates the total concentration of hydrogen cations present within an alumino-silicate and that the spatial concentration of these cations is dependent on the ordered internal structure of the specific alumino-silicate being treated.

Because the unique activity of the alumino-silicate catalyst for effecting the present rearrangement reactions is dependent on the availability of the active cation sites as well as the nature of the sites, the defined pore size of the alumino-silicate is to be considered when preparing the catalyst of this invention. In general, the alumino-silicate should have a pore size of such dimensions that it can accept the cyclic reactants within its ordered internal structure and also allow egress of the cyclic and branched chain products. It will be appreciated that in certain instances alumino-silicates having small pore sizes provide effective catalysts for the production of certain thiols or olefinic compounds because of their particular molecular configurations. Preferably, the pore size is from about 5 A. to about 15 A. in diameter. It will be appreciated that the pore size selected for the alumino-silicate catalyst will depend on the reactants to be employed as well as the configuration of the reaction products that are to be produced.

Typical of the alumino-silicates employed in accordance with this invention, are several alumino-silicates, both natural and synthetic, which have a defined pore size of from 5 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

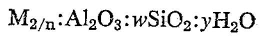

$$M_{2/n}:Al_2O_3:wSiO_2:yH_2O$$

wherein M is a cation which balances the electrovalence of the aluminum-containing tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in the molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

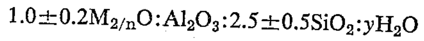

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

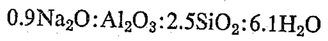

$$0.9Na_2O:Al_2O_3:2.5SiO_2:6.1H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 6 and X may be a value up to about 9.

The selectivity of zeolite Y for larger molecules is appreciably the same as zeolite X because its pore size extends from 10 A. to 13 A.

Another synthesized crystalline alumino-silicate, designated as zeolite A, has been found to be effective for the purposes of this invention. This zeolite may be represented in mole ratios of oxides as:

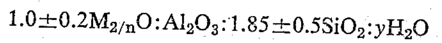

$$1.0\pm0.2M_{2/n}O:Al_2O_3:1.85\pm0.5SiO_2:yH_2O$$

wherein M represents a metal, $n$ is the valence of M, and $y$ is any value up to about 6.

The sodium form of this zeolite may be represented by the following formula;

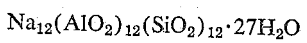

$$Na_{12}(AlO_2)_{12}(SiO_2)_{12}\cdot 27H_2O$$

This material often designated as "4A Molecular Sieve," has a pore size of about 4 A. in diameter. When the sodium cations have been substantially replaced with calcium by conventional exchange techniques, the resulting zeolite is designated as "5A Molecular Sieve" and has a defined pore size of about 5 A. in diameter.

Another alumino-silicate material found to be active in the present process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

$$Na_8(AlO_2)_8(SiO_2)_{40}24H_2O$$

Mordenite has an ordered crystalline structure made up of chains of 5-membered rings of tetrahedra. The crystal has a system of parallel channels having free diameters larger than 6.5 A., interconnected by smaller channels, parallel to another axis, on the order of 2.8 A. free diameters. As a result of this different crystalline framework, mordenite in proper ionic forms, sorbs benzene and cyclic hydrocarbons. However, it cannot accept some of the larger molecules which will be sorbed by zeolite X and zeolite Y.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, heulandite, clinoptilolite, chabazite, gmelinite, mordenite and dachiardite.

One of the alumino-silicate catalysts for the process of this invention is prepared from the sodium form of zeolite X having a pore size of 13 A. This alumino-silicate is a commercially available zeolite designated as Linde 13X. A more preferred catalyst is prepared as a result of a conventional treatment (base exchanging) involving partial or complete replacement of the sodium of zeolite X by contact with a fluid medium containing cations of at least one of the rare earth metals. Any medium which will ionize the cations without affecting the crystalline structure of the zeolite may be employed. After such treatment, the resulting exchanged zeolite product is water washed, dried and dehydrated. The dehydration thereby produces the characteristic system of open pores, passages, or cavities of the crystalline alumino-silicates.

As a result of the above treatment, the rare earth exchanged alumino-silicate is an activated crystalline catalyst material in which the molecular structure has been changed by having metallic rare earth cations and hydrogen cations chemisorbed or ionically bonded thereto. It will be understood that the hydrogen cations found within the alumino-silicate result from the hydrolysis of the rare earth cations in a manner heretofore described. Because specific rare earth metal cations as well as a mixture of several different rare earth metal cations may be base exchanged with the alumino-silicate, the concentration of hydrogen cation sites produced within the catalyst may vary depending on the completeness of the exchange as well as the rare earth cations employed. Thus, it has been found that the rare earth exchanged zeolite X catalyst of this invention may contain from about 0.5 to about 1.0 milliequivalent of hydrogen per gram of solid catalyst. Furthermore, it will be appreciated that the defined pore size of the rare earth exchanged zeolite X may vary from above 6 A., generally from 6 A. to 15 A., and preferably in the approximate range of 10 A. to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture have the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen cations to replace the sodium cations from the alumino-silicate. This base exchange may be accomplished by treatment with a fluid medium containing the rare earth salts followed by another containing hydrogen cations or cations capable of conversion to hydrogen cations. Inorganic and organic acids represent the source of hydrogen cations, whereas ammonium compounds are representative of the compounds containing cations capable of conversion to hydrogen cations. It will be appreciated that this fluid medium may contain a hydrogen cation, an ammonium cation, or mixture thereof, and a pH range from about 1 to about 12.

Other effective catalysts for the present process can be prepared from alumino-silicates such as zeolite Y and mordenite. Advantageously, the sodium form of zeolite Y alone may be employed as catalytic material. Also, exchange of rare earth metals for the sodium cations within zeolite Y produces a highly active catalyst in a manner similar to that described for preparation of the rare earth exchanged zeolite X. Preferably, because of its high acid stability, zeolite Y may be treated by partially replacing the sodium cations with hydrogen cations. This replacement may be accomplished by treatment with a fluid medium containing a hydrogen ion or an ion capable of conversion to a hydrogen ion (i.e. inorganic acids or ammonium compounds or mixture thereof).

Zeolite 5A also may serve as an effective catalyst. This zeolite material may be base exchanged with other divalent metal cations in a manner similar to that described for preparation of the rare earth exchanged faujasites; preferably, however, it is used in its calcium form.

Mordenite may be activated to serve as a catalyst for the instant invention by replacement of the sodium cation with a hydrogen cation. The necessary treatment is essentially the same as that described above for the preparation of said zeolite Y except that a mineral acid such as HCl is used as a source of hydrogen cations. In general, the mordenite is reduced to a fine powder (approximately passing a 200 mesh sieve and preferably passing 300 and 325 mesh sieves or finer) and then acid treated.

It will be appreciated that cations of other metals than the rare earths having mono- and polyvalences may be employed to replace the exchangeable cations from the alumino-silicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, and the like may also be employed. It will be understood that the chemical properties of the metal, i.e., its atomic radius, degree of ionization, hydrolysis constant, and the like, will determine its suitability for exchange with a particular alumino-silicate material. It will also be appreciated that certain divalent metals such as calcium, barium, and magnesium may be used with ammonium chloride or like ammonium compounds to produce active cation sites within the alumino-silicate catalyst by conventional base exchange techniques, the ammonium cations being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Ser. No. 147,722, filed Oct. 26, 1961 by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of 1/16" to 1/8" size, for example, obtained upon pelleting the alumino-silicate with a suitable binder such as clay. The zeolite X, described hereinabove, may be obtained on a clay-free basis or in the form of pellets in which clay is present as a binder.

Because the reaction temperature controls the nature of the reaction products, it is one of the important operating conditions for the processes contemplated by this invention. Thus, the synthesis of mercaptans from the reaction of olefins and hydrogen sulfide may be effected from about 25° to about 200° C. Usually temperatures below 150° C. are used.

When it is desired only to react the tertiary of olefins in a hydrocarbon stream containing other olefinic compounds, temperatures below 100° C. are often required, preferably the temperatures for selective synthesis range from about 25° to about 70° C.

It will be appreciated that the choice of specific reaction temperatures will be dependent on the reactivity of the olefin and also on the activity of the alumino-silicate catalyst to be used. Often extended contact times are required at the lower temperatures for conversion of the less reactive olefins.

The higher reaction temperatures are governed by the dehydrosulfurization or decomposition temperature of the mercaptan products. Tertiary mercaptans may revert to tertiary olefins and hydrogen sulfide at temperatures as low as 150° C., particularly at low space velocities and in the presence of the highly acid alumino-silicate catalyst such as acid mordenite.

Generally, dehydrosulfurization of mercaptans (thiols) may be effected over a wide range of reaction temperatures. Temperatures as low as 150° C. may be employed. Usually the reaction temperature does not exceed above 500° C. Preferably, the reaction temperatures are from about 200° to about 450° C. For example, it has been found that the reaction temperatures for producing butylene from butyl mercaptan may range from about 150° to about 400° C.

At the upper range of reaction temperature, degradation and polymerization of the olefinic products may occur. The by-products resulting from such side reactions may cause accumulation of coke-like deposits on the catalyst that alter the availability of the active cation sites for contact with the reactants. Consequently, the unique activity of the alumino-silicate may be reduced at these higher temperatures. However, it will be appreciated that the choice of reaction temperatures is also affected by the other operating conditions. Thus, in certain instances, temperatures above 500° C. may be utilized with high pressures to produce improved yields of the olefinic products, particularly from primary mercaptans, i.e. those compounds in which the carbon atom bonded to the mercapto group only is attached to one carbon atom.

The pressure utilized by the present process may extend from about atmospheric to pressures of several atmospheres. Often, higher pressures (e.g. 200–400 p.s.i.g.) are effective for promoting improved yields from the less reactive olefinic compounds and for dehydrosulfurization of mercaptans at higher temperatures by reducing undesirable side reactions. Apparently, at higher pressures, liquid phase operation facilitates transfer of the reactants and products through the catalyst by washing out or otherwise preventing accumulation of coke-like deposits. Such higher pressures may, in some cases, be obtained by mixing inert carrier gases such as nitrogen, helium, or the like, with the reactants.

The amount of catalyst used to effect the reactions of this invention may vary considerably depending on whether the reaction is conducted as a batch-type operation, a continuous or a semi-continuous process. Generally, during batch-type operation it has been found that the amount of catalyst may extend from about 1.0 percent by weight to about 10 percent by weight of the charged olefins or mercaptans. In continuous or semi-continuous processes where one or more reactor vessels are employed with cyclic regeneration of the catalyst, the amount of catalyst, as measured in terms of the liquid hourly space velocities of the reactants may be in the range from about 0.1 to about 10.0. Usually, space velocities from about 0.5 to about 2.0 are required for selective synthesis of mercaptans from tertiary olefins. It will be understood that the catalysts of this invention may be readily regenerated during the cyclic continuous processes or subsequent to their use in batch-type operation by burning the contaminants off in an air stream at temperatures of about 550° C. for about one to about three hours.

The molar ratios between the olefinic compounds and hydrogen sulfide usually are in stoichiometric proportions, e.g. (1:1). Also, in certain instances where the olefins are tertiary or secondary, or where reaction temperatures are relatively high, it may be desirable to use an excess of hydrogen sulfide. Often, this procedure reduces or prevents the tendency of the olefins to polymerize and thereby increases the yield of desired products.

It will be appreciated that the operating conditions employed by the present invention will be dependent upon the specific reaction being effected. Such conditions as temperature, pressure, space velocity, presence of inert carrier gases and the like, will have important affects on the processes. Accordingly, the manner in which these conditions affect the processes of this invention may be more readily understood by reference to the following specific examples.

The reactions for synthesizing or decomposing mercaptans were carried out in Vycor tubular reactors, each having a thermo-well extending into a catalyst bed containing from 5 to 20 grams of an alumino-silicate catalyst. The reactors were wrapped with resistance wire and insulated with asbestos tape and aluminum foil for providing heat to the catalyst. A variable transformer was used to regulate the heat input. The bottom of each reactor was connected to a water cooled condenser to remove the high boiling components from the effluent stream. A conventional amine absorbent unit for removing hydrogen sulfide was connected to the gas outlet of the condenser of the reactor used to decompose the mercaptans.

Two of the above-described Vycor reactors were interconnected for series flow via a separating system composed of a caustic scrubber, a stream heated still, and a cooled condenser. The outlet of the reactor having its inlet coupled to the condenser was connected to an amine absorber unit. Operation was as follows: Initially the catalyst was raised to the reaction temperature. Then the reactants were passed over the catalyst for extending periods of continuous operation. In several runs, the product stream was condensed, treated to remove hydrogen sulfide (when necessary), and analyzed by vapor phase chromatography or infrared techniques. In some cases, samples were taken before removal of the hydrogen sulfide.

In the runs using two reactors for selectively separating tertiary olefins from other olefins in a hydrocarbon mixture, the effluent gas of the first reactor containing the tertiary mercaptans was passed through the separating system to remove the mercaptans. The purified mercaptans were then passed into the second reactor to be converted back to the tertiary olefins at a higher operating temperature than that of the first reactor. The resulting gaseous mixture of olefins and hydrogen sulfide was then discharged to the amine absorber unit which used ethanolamine to remove the hydrogen sulfide. The gaseous olefins were collected and analyzed by vapor phase chromatography.

One of the catalysts employed during these runs was prepared from 13X zeolite (the sodium form of zeolite X having a pore size of 13A). Another was produced by exchanging this material with cations of the rare earth metals, followed by washing, drying and calcining in the manner heretofore described. Also, catalysts were prepared from an acid exchanged mordenite, a hydrogen exchanged zeolite X, and a 5A zeolite.

*Example I*

A gaseous mixture containing 0.2 cu. ft./hr. of hydrogen sulfide and 0.1 cu. ft./hr. of ethylene (mole ratio of 1:2) are metered into the top of a Vycor reactor and passed over 10 grams of a rare earth exchanged 13X zeolite at a temperature of 150° C. After 30 minutes, the weight percent conversion of ethylene to ethyl mercaptan is 45 percent.

*Example II*

The gaseous mixture of ethylene and hydrogen sulfide used in Example I is passed over a 13X zeolite catalyst for 30 minutes. Again, the effluent stream is continuously condensed and the liquid product analyzed. A 35 weight percent conversion of ethylene to ethyl mercaptan is obtained.

*Example III*

Five gms. of acid mordenite are placed in a Vycor reactor and heated to 150° C. Then 0.1 cu. ft./hr. of propylene and 0.1 cu. ft./hr. of hydrogen sulfide are passed over the catalyst for 30 minutes. The weight percent conversion of propylene to propyl mercaptan is 60 percent.

*Example IV*

A Vycor reactor is charged with ten gms. of a hydrogen exchanged zeolite Y catalyst and heated to 200° C. Then 0.1 cu. ft./hr. cyclohexene and 0.1 cu. ft./hr. of hydrogen sulfide were passed over the catalyst at a cyclohexene LHSV of 0.5. After 60 minutes, analysis by vapor phase chromatography showed that 90 weight percent of cyclohexene was converted to cyclohexyl mercaptan.

*Example V*

Isobutylene at 0.2 cu. ft./hr. and hydrogen sulfide at 0.2 cu. ft./hr. is passed over 10 gms. of a 13X zeolite catalyst at a temperature of 175° C. for 60 minutes. The resulting product is collected and condensed to separate tertiary butyl mercaptan from the unreacted isobutylene and hydrogen sulfide. The weight percent of isobutylene converted to the mercaptan was 90 percent.

*Example VI*

Twenty gms. of ethyl mercaptan was passed over five gms. of sodium 13X zeolite in a tubular reactor at a temperature of from about 350° to about 450° C. for a period of about 30 minutes. The resulting product was collected and analyzed by vapor phase chromatography. A weight percent conversion of ethyl mercaptan to ethylene of 90 percent was obtained.

*Example VII*

Five gms. of acid mordenite is placed in a tubular reactor and heated to a temperature of 300° C. Then 20 gms. of 2-pentanethiol is passed over the catalyst in 120 minutes at 200 p.s.i.g. The weight percent of 2-pentanethiol converted to 2-pentene is 45 percent.

*Example VIII*

Twenty gms. of 3-propanethiol is passed over 10 g. of a catalyst of 1/16" pellets of a 5A zeolite at a liquid hourly space velocity of one in a tubular reactor at a temperature of about 250° to about 350° C. After 120 minutes, the product is analyzed by vapor phase chromatography and showed a weight percent conversion of 3-propanethiol to propylene of 45 percent.

*Example IX*

Twenty gms. of liquid cyclohexyl mercaptan is passed over 10 grams of a 13X xeolite catalyst at a temperature of 350° C. with a liquid hourly space velocity of 0.5 The resulting product is collected and analyzed to give 90 weight percent conversion ot cyclohexene.

*Example X*

Cyclohexyl mercaptan at a liquid hourly space velocity of 0.5 was passed over a hydrogen exchanged zeolite Y catalyst in a tubular reactor at a temperature of about 300° to about 400° C. After 30 minutes, the liquid product collected in the condensing system is analyzed and shows 85 weight percent conversion to cyclohexene.

*Example XI*

Ten gms. of a rare earth exchanged 13X zeolite is placed in a tubular reactor and heated to about 300° C. Then 45 gms. of tertiary butyl mercaptan is passed through the catalyst bed in 120 minutes. The resulting product is treated to remove hydrogen sulfide and analyzed to yield 27 gms. of isobutylene.

*Example XII*

A gas stream containing 25 percent by weight of isobutylene, 60 percent by weight of n-butylenes, 10 percent by weight of propane, and 5 percent by weight of methane at a total gas rate of 2.0 cu. ft./hr. is mixed with 0.5 cu. ft./hr. of hydrogen sulfide and passed over 20 grams of 13X zeolite catalyst at 150° C. for a period of ten hours.

The resulting products are continuously treated with a solution of caustic soda in a scrubber to remove the sulfur containing products from the unreacted hydrocarbons. The sulfur compounds in the caustic solution are removed from the scrubber, heated and fractionated to yield 520 gms. of tertiary butyl mercaptan. This tertiary mercaptan is pumped into a reactor containing 20 gms. of the 13X zeolite catalyst heated to a temperature of 300° C., at a liquid hourly space velocity of 0.5. The resulting product effluent stream is passed into an absorber tower where ethanol amine removes hydrogen sulfide to yield 270 gms. of isobutylene—a 90 percent recovery based on that charged to the first reactor.

*Example XIII*

Using the same procedure as in Example XII, 0.5 cu. ft./hr. of a gas mixture containing 50 percent by weight of trimethyl ethylene, 30 percent by weight of n-amylene, 15 percent by weight of pentane, 5 percent by weight of methane, and 0.5 cu. ft./hr. of hydrogen sulfide are passed over 20 grams of a catalyst of a rare earth exchanged 13X zeolite at a temperature of 150° C. for three hours. The resulting mercaptan is separated from the hydrocarbons in a caustic scrubber, removed from the caustic solution and then passed to a reactor containing 20 gms. of a hydrogen exchanged zeolite Y catalyst heated to a temperature of 350° C. After 120 minutes at a liquid hourly space velocity of two the mercaptan is converted to 119 gms. of trimethyl ethylene; a recovery of 87 percent based on the weight of olefin found in the original hydrocarbon mixture.

It will be appreciated that the examples set forth above as well as the foregoing specification are merely illustrative of the mercaptans and olefins produced in accordance with the present processes and that other such compounds may be produced in the presence of the alumino-silicate catalysts contemplated by this invention.

It will also be appreciated that the alumino-silicates having active cation sites other than those used in the examples may be employed as catalysts for the present processes and that various modifications and alterations may be made in the processes without departing from the spirit of the invention.

What is claimed is:

1. A process for converting mercaptans to compounds having an olefinic linkage which comprises effecting dehydrosulfurization of a mercaptan in the presence of a catalyst comprising an aluminosilicate containing active cation sites within an ordered internal structure with a pore size of from at least 5 A. to 15 A. in diameter.

2. The process of claim 1 in which the mercaptan includes acyclic, alicyclic, cyclic, aromatic and heterocyclic compounds containing from 1 to 30 carbon atoms per molecule.

3. The process of claim 1 in which the aluminosilicate catalyst has a silicon to aluminum ratio of at least 1.8 within an ordered internal structure.

4. The process of claim 1 in which the cations are selected from the group consisting of exchangeable metals, ammonium, hydrogen, and mixtures thereof.

5. The process of claim 1 in which said cations are of the rare earth metals.

6. The process of claim 1 in which said cations are selected from the group consisting of the alkali metals and the alkaline earth metals.

7. The process of claim 1 in which the aluminosilicate catalyst is faujasite or homologs thereof.

8. The process of claim 1 in which the aluminosilicate catalyst is contained in a porous matrix.

9. A process for selectively separating a tertiary olefin from other olefins contained in a hydrocarbon mixture which comprises effecting reaction of the tertiary olefin and hydrogen sulfide to form the corresponding tertiary mercaptan under certain operating conditions, separating the tertiary mercaptan from the hydrocarbon mixture, effecting dehydrosulfurization of the mercaptan to form the tertiary olefin and hydrogen sulfide under other operating conditions and recovering the tertiary olefin; said reactions being effected in the presence of a catalyst comprising an aluminosilicate containing active cation sites within an ordered internal structure with a pore size of from at least 5 A. to 15 A. in diameter.

10. The process of claim 9 in which the certain operating conditions include catalyst contact times from a fraction of a second to a few minutes, reaction temperatures below about 100° C., and vapor phase operation.

11. The process of claim 9 in which said other operating conditions include reaction temperatures above about 150° C.

12. The process of claim 9 in which the aluminosilicate catalyst has a silicon to aluminum ratio of at least 1.8 within an ordered internal structure.

13. The process of claim 9 in which the cations are selected from the group consisting of exchangeable metals, ammonium, hydrogen, and mixtures thereof.

14. The process of claim 9 in which the aluminosilicate catalyst is contained in a porous matrix.

15. A process for separating isobutylene from a hydrocarbon mixture containing n-butylenes which comprises effecting reaction of isobutylene and hydrogen sulfide at a temperature from about 50° to about 200° C. at a space velocity of from 0.2 to 10, to form tertiary butyl mercaptan, separating said mercaptan from the hydrocarbon mixture, effecting dehydrosulfurization of the mercaptan to reform isobutylene and hydrogen sulfide at a temperature of from 200° to about 500° C. and recovering isobutylene;

said reactions being effected in the presence of a catalyst comprising an aluminosilicate containing active cation sites within an ordered internal structure with a pore size of from at least 5 A. to 15 A. in diameter.

16. A process for separating trimethyl ethylene from a hydrocarbon mixture containing amylene which comprises effecting reaction of trimethyl ethylene and hydrogen sulfide at a temperature from about 50° to about 200° C. and at a space velocity of 0.2 to 10, to form tertiary amyl mercaptan, separating said mercaptan from the hydrocarbon mixture, effecting dehydrosulfurization of the mercaptan to reform trimethyl ethylene and hydrogen sulfide at a temperature of from about 200° to about 500° C., and recovering the trimethyl ethylene; said reactions being effected in the presence of a catalyst comprising an aluminosilicate containing active cation sites within an ordered internal structure with a pore size of from at least 5 A. to 15 A. in diameter.

References Cited by the Examiner

UNITED STATES PATENTS

| | | | |
|---|---|---|---|
| 2,386,773 | 10/1945 | Badertscher et al. | 260—77 |
| 3,140,322 | 7/1964 | Frillet et al. | 260—677 |

ALPHONSO D. SULLIVAN, *Primary Examiner.*